Dec. 23, 1941.                    C. E. McCOY                    2,266,887
                                MOLDING APPARATUS
                               Filed Oct. 7, 1939                 2 Sheets-Sheet 1

INVENTOR
C. E. McCOY
BY Emery Robinson
ATTORNEY

Dec. 23, 1941.  C. E. McCOY  2,266,887
MOLDING APPARATUS
Filed Oct. 7, 1939  2 Sheets-Sheet 2

INVENTOR
C. E. McCOY
BY Emery Robinson
ATTORNEY

Patented Dec. 23, 1941

2,266,887

UNITED STATES PATENT OFFICE 2,266,887

MOLDING APPARATUS

Clarence E. McCoy, Western Springs, Ill., assignor to Western Electric Company, Incorporated, New York, N. Y., a corporation of New York Application October 7, 1939, Serial No. 298,377

3 Claims. (Cl. 18—42)

This invention relates to molding apparatus and more particularly to apparatus for use in compression molding articles having long narrow cavities.

Considerable difficulties have been experienced in molding plastics which cure under heat and pressure, such, for example, as phenolic condensation products and other thermal setting plastics when it became necessary to mold articles having deep, narrow, thin-walled cavities therein, due to the tendency of the long thin core piece conventionally used to be forced out of the desired position by the molding compound.

It is an object of the present invention to provide apparatus whereby articles having deep narrow cavities may be molded without utilizing long thin core molds.

In accordance with one embodiment of the invention, as specifically designed for molding ticket holders for use in telephone toll exchanges, a pair of molding dies and a die insert are provided. One of the pairs of molding dies has a cavity therein which defines the outer surface of a major portion of the article to be formed and each die has extending from it a series of rectangular core members adapted to nest together and substantially fill the entire die cavity, leaving spaces between the walls of the die cavity and the ends of the core members free to receive the molding material whereby a ticket holder may be formed comprised of alternate bars and interstices extending along each side of it and the die insert, which is suitably formed, cooperates with the ends of the series of cores to form the entrance and upper portion of the ticket holder.

A better understanding of the invention will be had by reference to the accompanying drawings, wherein Fig. 1 is a front elevational view of a pair of molding dies made in accordance with the present invention;

Figure 1:
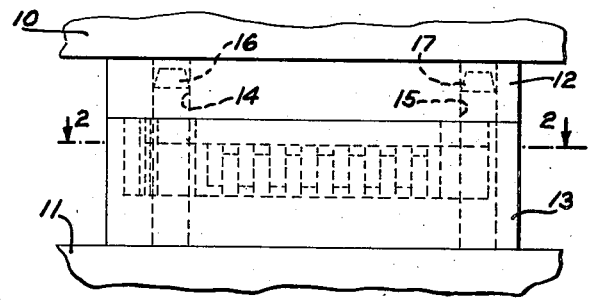
Figure 2:
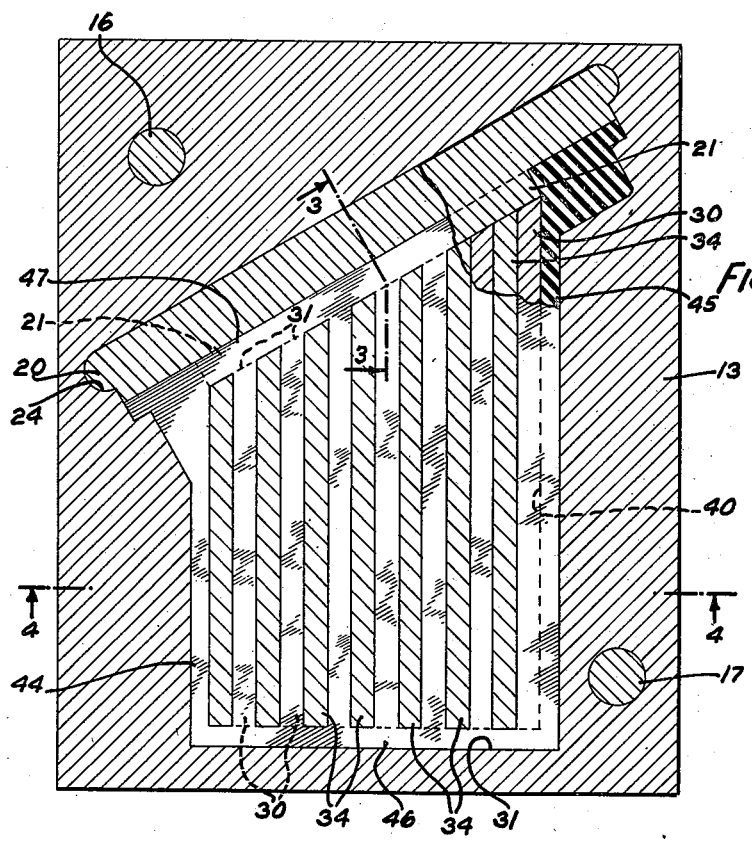
Fig. 2 is a horizontal sectional view taken along the line 2—2 of Fig. 1, parts being broken away to show the relation of the die insert to the core members.
Figure 3:
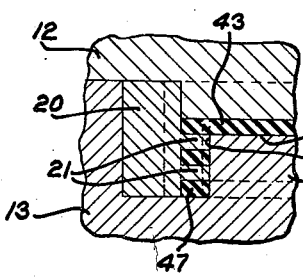
Fig. 3 is a developed sectional view taken on the line 3—3 of Fig. 2 in the direction of the arrows.

Referring to the drawings, wherein like reference numerals designate the same parts throughout the several views, particular reference being had at this time to Fig. 1, the reference numerals 10 and 11 designate the head and base, respectively, of a molding press on which upper and lower die blocks 12 and 13 may be fixed. The upper die block 12 has a pair of apertures 14 and 15 formed therein for receiving guide pins 16 and 17, respectively, fixed to the lower die block 13. Positioned in the lower die block is a die insert 20 having a pair of ribs or cores 21 formed thereon and extending substantially the length thereof. The ribs 21 are rounded at their ends, as shown at 22—22 (Fig. 5) and serve to mold the entrance slots 23—23 of the ticket holder as shown in Fig. 6. The die insert 20 is rounded at its ends, as shown in Fig. 2, and fits within a correspondingly formed cavity 24 in the lower die block.

The lower die block has formed thereon a series of upwardly extending core members 30, which extend from a point near the forward end (the lower end, Fig. 2) of a die cavity 31 formed in the die block 13 to a point where they are tapered as shown at 31—31 to engage with the ribs 21.

Figure 4:
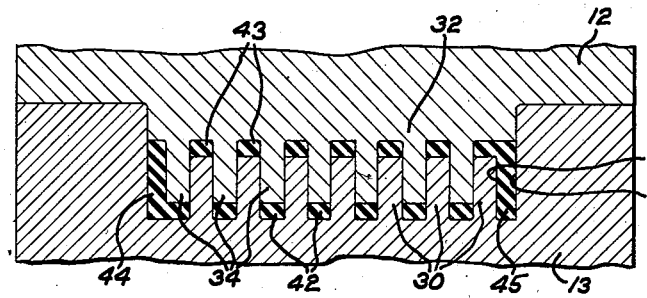
Fig. 4 is a transverse sectional view taken on the line 4—4 of Fig. 2 in the direction of the arrows showing the manner in which the extending cores nest.
Figure 5:
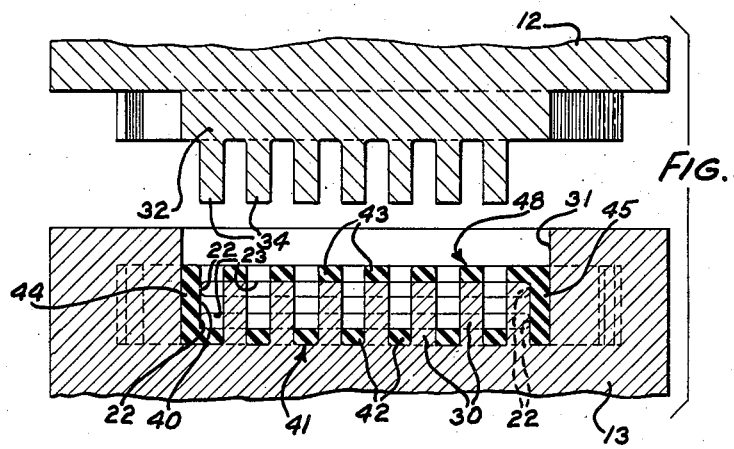
Fig. 5 is a transverse sectional view taken substantially along the line 4—4 of Fig. 2 in the direction of the arrows and showing the upper and lower dies open with the molded part in the lower die.
Figure 6:
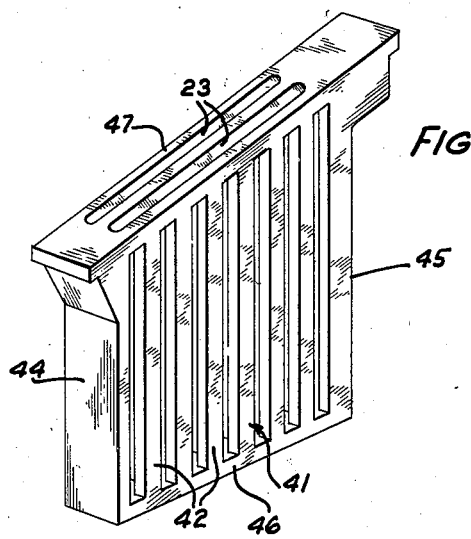
Fig. 6 is a perspective view of a ticket holder molded by the die structure shown in the other views.

The cores 30 extend upwardly, as shown most clearly in Figs. 4 and 5, from the base of the die cavity to a point adjacent the top of the body portion 32 of the upper die block 12 when the dies are completely closed, as shown in Fig. 4. The body portion 32 of the upper die block 12 has extending downwardly from it a series of core members 34, rectangular in cross section, and of a width such that they will just fit between the core members 30 when the die is closed, as shown in Fig. 4. The core members 34 are of such height that they will, when the dies are closed, extend to a point adjacent the base of the die cavity 31 in the lower die block 13. It will thus be apparent, by reference to Fig. 4, that when the two dies are closed, the core members 30 and 34 will nest with one another so as to fill substantially all of the die cavity 31, leaving open only the two ends of the cavity, as viewed in Fig. 4, and those portions of the cavity opposite the top and bottom edges of the core members 30 and 34, thereby permitting the molding material to occupy the spaces indicated by the heavy cross hatching in Figs. 4 and 5. In this manner, a ticket holder having a deep, narrow cavity 40 with two entrance apertures 23 will be formed. The ticket holder, in its final form, will comprise the side wall 41, made up of a series of bars 42; the side wall 48, made up of a series of bars 43; end walls 44 and 45; a base 46; and a slotted top 47.

A specific embodiment of the invention has been described hereinbefore for manufacturing a ticket holder, but it will be understood that the invention is to be limited only by the scope of the appended claims.

What is claimed is:

1. In a molding apparatus, a pair of molding dies, a molding member removably positioned in a cavity in one of said dies, and a series of core members on each of said molding dies so arranged on their respective dies as to nest and fill all except small portions adjoining the wall of the die cavity of one of said dies and cooperating with the removable molding member during a molding operation.

2. In an apparatus for molding ticket holders, a die member having a cavity therein, a cooperating die member having a plurality of projecting core members, projecting core members formed in the cavity in the first mentioned die to occupy all, except a small wall adjoining portion, of the space in the interstices between the projecting core members on the second die member to mold the body portion of said ticket holder, and a die insert cooperating with said die members to mold the upper portion of the ticket holder, said die insert having core projections for engaging the projections on the two die members to cooperate with said projections in forming the internal cavity in the ticket holder.

3. In an apparatus for molding ticket holders, a die member having a cavity therein, a cooperating die member having a plurality of projecting core members, projecting core members formed in the cavity in the first mentioned die to occupy all, except a small longitudinally extending portion, of the space in the interstices between the projecting core members on the second die member adjacent the wall of the second die member to mold the body portion of said ticket holder, and a die insert cooperating with said die members to mold the upper portion of the ticket holder and having projections thereon to form the entrance aperture of the ticket holder, said projections abutting the projecting core members to cooperate with them in forming the cavity in the ticket holder.

CLARENCE E. McCOY.